(12) United States Patent
Topatan et al.

(10) Patent No.: US 11,003,314 B2
(45) Date of Patent: *May 11, 2021

(54) PRESENTATING ACTION MENUS IN VIEWING PANES

(71) Applicant: Microsoft Technology Licensing, LLC, Redmond, WA (US)

(72) Inventors: Kutlay Topatan, Seattle, WA (US); Poonam G. Hattangady, Seattle, WA (US); Yung-Cheng Chen, Bellevue, WA (US); Jeffrey Feiereisen, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 495 days.

This patent is subject to a terminal disclaimer.

(21) Appl. No.: 15/293,132

(22) Filed: Oct. 13, 2016

(65) Prior Publication Data
US 2017/0031547 A1 Feb. 2, 2017

Related U.S. Application Data

(63) Continuation of application No. 13/896,492, filed on May 17, 2013, now Pat. No. 9,495,075.

(51) Int. Cl.
*G06F 3/00* (2006.01)
*G06F 3/0482* (2013.01)
*H04L 12/58* (2006.01)

(52) U.S. Cl.
CPC ............ *G06F 3/0482* (2013.01); *H04L 51/22* (2013.01); *G06F 2203/04803* (2013.01)

(58) Field of Classification Search
CPC combination set(s) only.
See application file for complete search history.

(56) References Cited

U.S. PATENT DOCUMENTS

| | | | |
|---|---|---|---|
| 7,409,644 B2 | 8/2008 | Moore et al. | |
| 7,689,655 B2 | 3/2010 | Hewit et al. | |
| 8,166,392 B2 | 4/2012 | Horvitz | |
| 8,963,962 B2 | 2/2015 | Ubillos | |
| 10,133,439 B1* | 11/2018 | Brichter | G06F 3/0481 |
| 2005/0004990 A1* | 1/2005 | Durazo | G06Q 10/107 |
| | | | 709/206 |

(Continued)

OTHER PUBLICATIONS

"Action Bar", Jan. 14, 2012; 9 pages; Android.com; http://developer.android.com/design/patterns/actionbar.html#contextual.

(Continued)

*Primary Examiner* — Hien L Duong

(57) ABSTRACT

Disclosed herein are systems, methods, and software for implementing enhanced menu presentation technology. In at least one implementation, a user interface to a personal information service is presented by a suitable computing system. The user interface includes a viewing pane and an information panel in which various personal information items may be organized. In response to a selection of any of the personal information items for viewing, content associated with the item is presented in the viewing pane. In addition, in response to an identification of an action group that includes multiple ones of the personal information items, an action menu is presented in at least a portion of a space in the user interface occupied by the viewing pane.

21 Claims, 6 Drawing Sheets

(56) References Cited

U.S. PATENT DOCUMENTS

| | | |
|---|---|---|
| 2005/0005249 A1 | 1/2005 | Hill et al. |
| 2005/0223074 A1 | 10/2005 | Morris |
| 2006/0173961 A1 | 8/2006 | Turski et al. |
| 2006/0271864 A1 | 11/2006 | Satterfield et al. |
| 2008/0034315 A1 | 2/2008 | Langoulant et al. |
| 2008/0189622 A1 | 8/2008 | Sanchez et al. |
| 2008/0301245 A1 | 12/2008 | Estrada et al. |
| 2009/0070349 A1* | 3/2009 | Hiscock .............. G06F 16/9024 |
| 2009/0113449 A1* | 4/2009 | Balfe ..................... G06F 9/546 |
| | | 719/314 |
| 2009/0235196 A1 | 9/2009 | Rodden et al. |
| 2009/0319618 A1 | 12/2009 | Affronti et al. |
| 2010/0082759 A1 | 4/2010 | Nalliah et al. |
| 2010/0325211 A1 | 12/2010 | Ylinen et al. |
| 2011/0163970 A1 | 7/2011 | Lemay |
| 2011/0307804 A1 | 12/2011 | Spierer |
| 2012/0131474 A1 | 5/2012 | Panchadsaram et al. |
| 2012/0143806 A1 | 6/2012 | Sundelin et al. |
| 2012/0150772 A1 | 6/2012 | Paek et al. |
| 2012/0173632 A1 | 7/2012 | Chakra et al. |
| 2012/0284639 A1* | 11/2012 | Yuniardi ................ G06Q 10/00 |
| | | 715/752 |
| 2012/0290946 A1 | 11/2012 | Rodney et al. |
| 2013/0086175 A1 | 4/2013 | Claux et al. |
| 2013/0125060 A1 | 5/2013 | Lee et al. |
| 2013/0159429 A1 | 6/2013 | Selvaraj et al. |
| 2013/0204946 A1* | 8/2013 | Forstall ............... G06Q 10/107 |
| | | 709/206 |
| 2013/0297604 A1 | 11/2013 | Sutedja et al. |
| 2013/0332850 A1* | 12/2013 | Bovet ..................... H04L 51/22 |
| | | 715/752 |
| 2014/0223347 A1 | 8/2014 | Seo et al. |
| 2014/0245175 A1 | 8/2014 | Rydenhag et al. |
| 2014/0245178 A1 | 8/2014 | Smith |
| 2014/0282254 A1* | 9/2014 | Feiereisen ........... G06F 3/04842 |
| | | 715/835 |
| 2014/0304613 A1 | 10/2014 | Coe |
| 2015/0082189 A1* | 3/2015 | Baer ................... G06F 3/04842 |
| | | 715/752 |

OTHER PUBLICATIONS

Frederick W. Schumacher; "Email Visualization Strategies to Support Task Management:" Nov. 2007; pp. 1-49; Athabasca University, Athabasca, Alberta, Canada; http://dtpr.lib.athabascau.ca/action/download.php?filename=scis-07/open/schumacher_comp696_final.pdf.

"Notice of Allowance Issued in U.S. Appl. No. 13/896,492", dated Jul. 15, 2016, 5 Pages.

"Final Office Action Issued in U.S. Appl. No. 13/896,492", dated Jun. 19, 2015, 22 Pages.

"Non Final Office Action Issued in U.S. Appl. No. 13/896,492", dated Dec. 19, 2014, 22 Pages.

"Microsoft Outlook 2010", Retrieved from https://support.microsoft.com/en-us/lifecycle/search?alpha=outlook%202010, Retrieved on: Jan. 15, 2019, 1 Page.

* cited by examiner

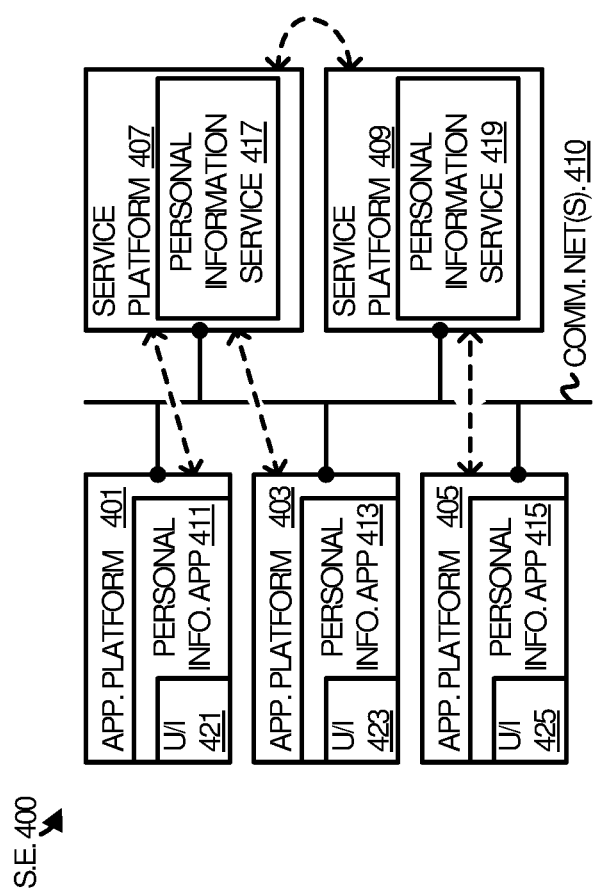

PRESENTATING ACTION MENUS IN VIEWING PANES

CROSS-REFERENCE TO RELATED APPLICATION(S)

This application is a Continuation of, and claims priority to, U.S. patent application Ser. No. 13/896,492, filed May 17, 2013, entitled "PRESENTING ACTION MENUS IN VIEWING PANES," which is incorporated herein by reference in its entirety.

TECHNICAL FIELD

Aspects of the disclosure are related to computing hardware and software technology, and in particular to action menus in personal information applications.

TECHNICAL BACKGROUND

Personal information services provide users with effective and convenient ways to communicate with others and to manage their personal information. Users typically interact with personal information services through user interfaces provided by associated personal information applications, such as email applications, calendar applications, and task management applications, as well as combinations and variations thereof. Some representative personal information applications and services include Microsoft® Outlook®, Outlook® Web App (OWA), Hotmail®, Gmail®, and Yahoo® Mail, as well as others.

When engaged with a personal information service, a user may interact with various personal information items via a user interface to the service. Examples of such items include emails, contacts, calendar items, tasks, and the like. In a typical scenario, a user's personal information items are stored in a personal information database, such as a mailbox, that is accessed as the user interacts with the application.

Most personal information applications present personal information items in a variety of panels. In an email example, a user interface includes an inbox panel in which emails are arranged, while content associated with any of the emails can be viewed in a viewing panel. Other panels are possible, such as a navigation panel in which various folders are presented along with representations of other application modules.

In addition, most personal information applications include an action menu in which several action features are available. Any of the action features can be applied to any one or more of the items in an inbox that are identified as subject to the action features. In a brief example, a user may select a group of emails and then select a delete feature from an action menu to delete the group of emails. In another example, a user may select a group of emails and then select a move feature from an action menu to move the group of emails.

Action menus are typically presented in a horizontal arrangement, aligned above the inbox and viewing panels. However, they may also be accessed by performing a right-click or some other discrete step after having selected one or more items.

OVERVIEW

Provided herein are systems, methods, and software for implementing enhanced menu presentation technology. In at least one implementation, a user interface to a personal information service is presented by a suitable computing system. The user interface includes a viewing pane and an information panel in which various personal information items may be organized. In response to a selection of any of the personal information items for viewing, content associated with the item is presented in the viewing pane. In addition, in response to an identification of an action group that includes multiple ones of the personal information items, an action menu is presented in at least a portion of a space in the user interface occupied by the viewing pane.

This Overview is provided to introduce a selection of concepts in a simplified form that are further described below in the Technical Disclosure. It should be understood that this Overview is not intended to identify key features or essential features of the claimed subject matter, nor is it intended to be used to limit the scope of the claimed subject matter.

BRIEF DESCRIPTION OF THE DRAWINGS

Many aspects of the disclosure can be better understood with reference to the following drawings. While several implementations are described in connection with these drawings, the disclosure is not limited to the implementations disclosed herein. On the contrary, the intent is to cover all alternatives, modifications, and equivalents.

FIG. 4 illustrates a service environment in an implementation in which various computing platforms provide a personal information service.

TECHNICAL DISCLOSURE

Figure 2:
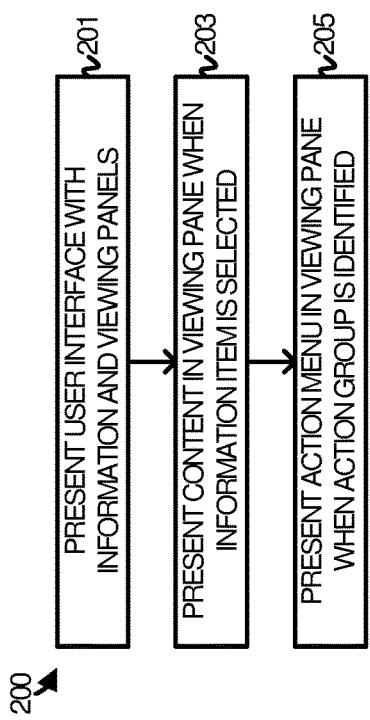
FIG. 2 illustrates an enhanced menu process carried out by a suitable computing platform or platforms in an implementation.

Implementations disclosed herein enable enhanced menu presentation technology whereby an action menu may be presented in the same space in a user interface as that occupied by a viewing pane. This advance enables the placement of an action menu in a place that may otherwise be under used in various circumstances. In addition, such placement may optionally make available other space in a user interface previously occupied by an action menu. This may be especially beneficial in the context of tablet devices, mobile phones, and other systems with relatively limited display space.

In a brief operational example, a personal information application provides a user interface to a personal information service. The personal information application or at least a portion thereof, drives a suitable computing platform to present the user interface to the personal information service. The user interface includes a viewing pane and an information panel in which to organize various personal information items, such as emails, contacts, events, tasks, and the like.

Any of the personal information items may be selected and viewed. When one of the items is selected, content associated with the item is presented in the viewing pane. The selection of another item, without persisting the selection of the first item, results in content associated with the other item to be presented in the viewing panel, possibly substituting for the content previously presented in the viewing panel.

However, it may be the case that an action group is identified that includes multiple items. In response to the identification of the action group, an action menu is presented in at least a portion of a space in the user interface occupied by the viewing pane. This may entail, for example, displaying the action menu within the viewing pane in an overlaid manner with respect to any content that may be viewable in the pane. However, this may also entail ceasing the presentation of the content and presenting the action menu against a relatively blank canvas in the viewing pane. The entirety of the action menu may be presented in the viewing pane, although portions of it may overlap with other regions of the user interface, such as with portions of an inbox or some other panel.

An action group may be identified when the selection of one item occurs in such a manner that the selection of a previously selected item or items persists and are in a selected state simultaneously. The items may thus be understood to be concurrently selected. Items can be concurrently selected in a variety of ways, including checking a selection box associated with each item, holding a particular key (the control key, for example) when selecting items, or providing some other input or indication that two or more items are to be concurrently selected with respect to each other.

In various scenarios the action menu may include various action features applicable to each of the multiple items. An action corresponding to an action feature selected from the action menu can be applied to the multiple items. Which action features are included in an action menu may vary based on conditions present when a concurrent selection is made. The action features can be selected from a number of possible action features, the determination of which may be based on characteristics of each of the multiple items. Examples of characteristics of each item that may factor into the selection of action features include the attachment status of each item (such as the presence of an attachment or some other status), the folder location of each item, and the identity of contacts associated with each item, as well as any other characteristic.

Figure 3:
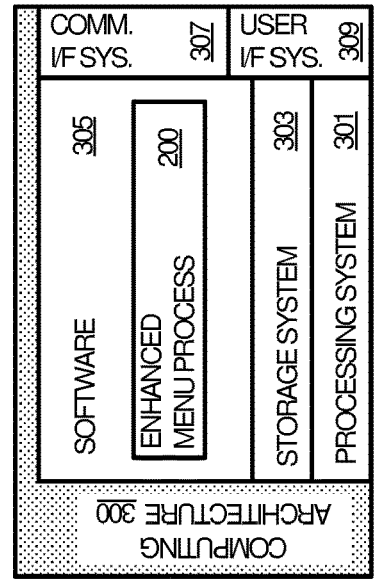
FIG. 3 illustrates a computing architecture suitable for implementing any computing platform in an implementation.
Figure 1:
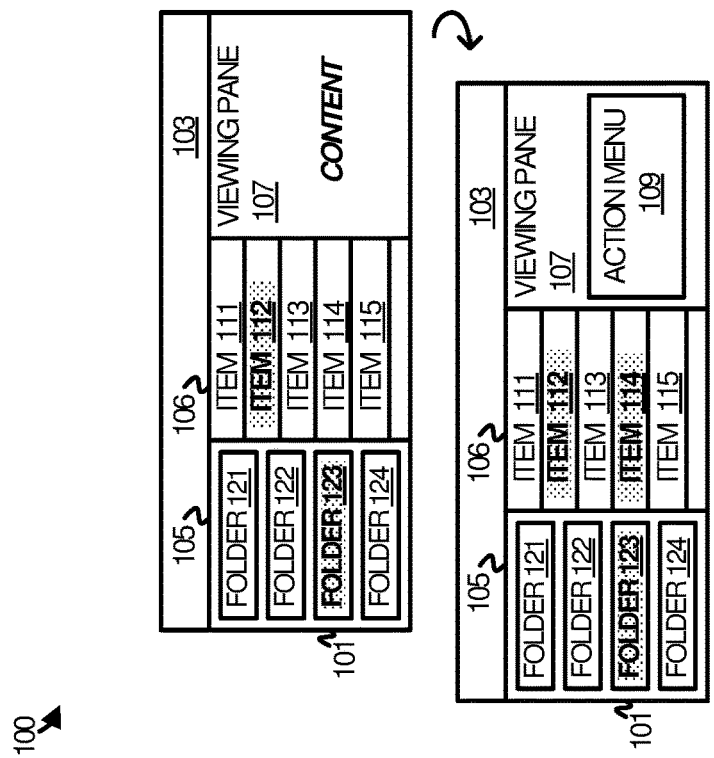
FIG. 1 illustrates a user interface to a personal information service and various operational features in an implementation.

Referring now to the drawings, FIG. 1 illustrates various features and functionality that may be experienced through a user interface 101 when an enhanced menu process 200, illustrated in FIG. 2, is implemented. The enhanced menu process 200 may be embodied in software executable by any suitable computing system or collection of systems employing a suitable computing architecture, of which computing architecture 300 in FIG. 3 is representative. The user interface 101 and its associated features and functionality may be rendered, surfaced, or otherwise presented and experienced when the software is executed. FIG. 4 illustrates a service environment 400 in which a personal information service may be provisioned and delivered, while FIGS. 5-8 illustrate another enhanced menu process 500 and related features and functionality.

In particular, FIG. 1 illustrates an operational scenario 100 involving a user interface 101 to a personal information service in an implementation. User interface 101 provides an interface through which a user may interact with various aspects of a personal information service. Examples of user interface 101 include graphical user interfaces, natural user interfaces, web-based user interfaces, gesture-based user interfaces, and object-oriented user interfaces, as well as any other type of user interface, combinations or variations thereof.

User interface 101 includes an application bar 103, which may be used to present various tools, information, features, or other aspects of a personal information service. In some implementations, for example, application bar 103 may include a search box, notifications, or other aspects of a personal information application. User interface 101 also includes a navigation panel 105, an information panel 106, and a viewing pane 107.

Each of these and other elements may be considered to occupy or define a space in user interface 101. Thus, navigation panel 105 occupies a space in user interface 101, information panel 106 occupies a space in user interface 101, and viewing pane 107 occupies a space in user interface 101. User interface 101 may include other elements in addition to or in place of those disclosed. In addition, some of the elements in user interface 101 are optional and may be omitted, including application bar 103 and navigation panel 105.

Navigation panel 105 may be any panel or other graphical representation with which a user may interact to navigate a personal information application or service. Navigation panel 105 may be used to, for example, navigate the various modules that may be included in an application, navigate data and associated data structures, or navigate in some other manner. In this implementation, navigation panel 105 includes several folders 121-124 representative of folders in which a user's personal information items may be organized. Examples of folders include, but are not limited to, an inbox, trash, sent folder, and the like. Folders 121-124 are provided merely for exemplary purposes and it may be appreciated that fewer folders or more folders are possible, as well as other elements through which a user may navigate a personal information application or service and associated information.

Information panel 106 may be any panel or other graphical representation within which personal information items may be organized and presented. Examples include an inbox, a calendar, and a task list. In operational scenario 100, information panel 106 includes items 111-115, each of which are representative of emails, events, tasks, or any other type of personal information item that can be presented in an information panel. Information panel 106 may be used to, for example, navigate the various information items that may be presented therein, such as by scrolling up or down a list, selecting an item for individual viewing, or selecting multiple items as an action group on which to take collective action. In this implementation, items 111-115 are drawn from folder 123, which is illustrated as selected in navigation panel 105.

Viewing pane 107 is representative of any graphical element in which content associated with a selected item can be presented and viewed. Other features and functions may be possible through viewing pane 107, such as the ability to respond to items or otherwise interact with content that may be presented. In general, an individual item can be selected from information panel 106 and its corresponding content presented in viewing pane 107. With respect to operational scenario 100, item 112 is selected. Accordingly its content is presented in viewing pane 107.

User interface 101 may be presented when, for example, a personal information application or other software associated with the personal information service is executed, while the various features and functionality illustrated by operational scenario 100 may be experienced when enhanced menu process 200 is implemented in such software. Examples of software in which enhanced menu process 200 may be implemented include, but are not limited to, personal information applications, browser applications, client-side programs, and server-side programs, as well as any other type of software program, combination of programs, or variations thereof. The execution of any such program or collection of programs by any suitable computing system or systems drives the system or systems to operate as described herein for enhanced menu process 200. Accordingly, the following discussion of operational scenario 100 makes reference parenthetically to the steps included in and illustrated with respect to enhanced menu process 200.

In operation, a user may interact with user interface 101 to interact with a personal information service, and more particularly, with various personal information items provided as part of the service. Such interaction includes, for example, sending and receiving emails, scheduling events, monitoring tasks, and so on. Accordingly, user interface 101 is presented to the user and includes information panel 106 and viewing pane 107 (step 201).

While interacting with the personal information service, a user may select or otherwise identify any of the items 111-115 that are presented in information panel 106. Upon selecting one of the items, its associated content is presented in viewing pane 107 (step 203). Operational scenario 100 assumes for exemplary purposes that item 112 is selected and its content presented in viewing pane 107.

While the selection of item 112 persists or is otherwise maintained, another item 114 is selected. The concurrent selection of two or more items may be considered an identification of an action group. The identification of the action group triggers the presentation of action menu 109 in viewing pane 107 (step 205). Action menu 109 may be presented entirely within viewing pane 107 or it may overlap with some other element of user interface 101. In some scenarios, viewing pane 107 may persist such that action menu 109 is presented in an overlaid manner. However, in other scenarios viewing pane 107 may be removed from view and action menu presented where viewing pane 107 had been. In either case, action menu 109 may be considered to be presented in at least a portion of a space in user interface 101 occupied by viewing pane 107.

Action menu 109 may include various action features, the selection of which causes a corresponding action to be applied to the personal information items in the action group. For example, action menu 109 may include a delete feature, the selection of which would cause item 112 and item 114 to be deleted. In another example, action menu 109 may include a move feature, the selection of which would cause item 112, and item 114 to be moved to a different location. Other types of action features and corresponding actions are possible and may be considered within the scope of the present disclosure.

Variations of enhanced menu process 200 are possible and may be considered within the scope of the present disclosure. For example, other steps in addition to those described herein may be performed. In addition, variations on the steps described herein are possible, including initiating a particular function or feature. In an example, enhanced menu process 200 as discussed herein includes the steps of presenting content in a viewing pane and presenting an action menu, among other steps. A variation of each could include initiating the presentation of content and initiating the presentation of an action menu. It may be appreciated that other variations are possible and may be considered within the scope of the present disclosure.

Referring now to FIG. 3, computing architecture 300 is representative of an architecture that may be employed in any computing apparatus or system or collections thereof to suitably implement all or portions of enhanced menu process 200 or variations thereof, and optionally all or portions of the personal information application referred to with respect to FIG. 1. Computing architecture 300 may be employed in, for example, desktop computers, laptop computers, tablet computers, notebook computers, mobile computing devices, cell phones, media devices, and gaming devices, as well as any other type of physical or virtual computing machine and any combination or variation thereof. Computing architecture 300 may also be employed in, for example, server computers, cloud computing platforms, data centers, any physical or virtual computing machine, and any variation or combination thereof.

Enhanced menu process 200 may be implemented on a single computing system or may be implemented in a distributed manner. The personal information application may also be implemented on a single computing system or may be implemented in a distributed manner Enhanced menu process 200 may be integrated with the personal information application, but may also stand alone or be embodied in some other application.

Computing architecture 300 includes processing system 301, storage system 303, software 305, communication interface system 307, and user interface system 309. Processing system 301 is operatively coupled with storage system 303, communication interface system 307, and user interface system 309. Processing system 301 loads and executes software 305 from storage system 303. When executed by processing system 301, software 305 directs processing system 301 or other elements of computing architecture 300 to operate as described herein for enhanced menu process 200 or its variations. Computing architecture 300 may optionally include additional devices, features, or functionality not discussed here for purposes of brevity.

Referring still to FIG. 3, processing system 301 may comprise a microprocessor and other circuitry that retrieves and executes software 305 from storage system 303. Processing system 301 may be implemented within a single processing device but may also be distributed across multiple processing devices or sub-systems that cooperate in executing program instructions. Examples of processing system 301 include general-purpose central processing units, application specific processors, systems on a chip, and logic devices, as well as any other type of processing device, combination, or variation thereof.

Storage system 303 may comprise any computer readable storage media readable by processing system 301 and capable of storing software 305. Storage system 303 may include volatile and nonvolatile, removable and non-removable media implemented in any method or technology for storage of information, such as computer readable instructions, data structures, program modules, or other data. Examples of storage media include random access memory, read only memory, magnetic disks, optical disks, flash memory, virtual memory and non-virtual memory, magnetic cassettes, magnetic tape, magnetic disk storage or other magnetic storage devices, or any other suitable storage media. In no case is the storage media a propagated signal. In addition to storage media, in some implementations storage system 303 may also include computer readable communication media over which software 305 may be communicated internally or externally.

Storage system 303 may be implemented as a single storage device but may also be implemented across multiple storage devices or sub-systems co-located or distributed relative to each other. Storage system 303 may comprise additional elements, such as a controller, capable of communicating with processing system 301 or possibly other systems.

Software 305 may be implemented in program instructions and among other functions may, when executed by processing system 301, direct processing system 301 or other elements of computing architecture 300 to operate as described herein for enhanced menu process 200. For example, the program instructions may, when executed by processing system 301, direct processing system 301 to initiate presentation of a user interface having an information panel and viewing pane, initiate presentation of content associated with a selected item in the viewing pane, and initiate presentation of an action menu in a space occupied by the viewing pane.

The program instructions may include various components or modules that cooperate or otherwise interact to carry out enhanced menu process 200. The various components or modules may be embodied in compiled instructions or interpreted instructions or in some other variation of or combination of instructions. The various components or modules may be executed in a synchronous or asynchronous manner, serially or in parallel, in a single threaded or multi-threaded environment, or in accordance with any other suitable programming and execution paradigm, variation, or combination thereof.

Software 305 may include additional processes, programs, or components, such as operating system software or other application software. Software 305 may also comprise firmware or some other form of machine-readable processing instructions executable by processing system 301.

In general, software 305 may, when loaded into processing system 301 and executed or otherwise processed, transform a suitable apparatus, system, or device employing computing architecture 300 overall from a general-purpose computing system into a special-purpose computing system customized to facilitate enhanced menu presentation technology as described herein for each implementation. Indeed, encoding software 305 on storage system 303 may transform the physical structure of storage system 303. The specific transformation of the physical structure may depend on various factors in different implementations of this description. Examples of such factors may include, but are not limited to, the technology used to implement the storage media of storage system 303 and whether the computer-storage media are characterized as primary or secondary storage, as well as other factors.

For example, if the computer-storage media are implemented as semiconductor-based memory, software 305 may transform the physical state of the semiconductor memory when the program is encoded therein, such as by transforming the state of transistors, capacitors, or other discrete circuit elements constituting the semiconductor memory. A similar transformation may occur with respect to magnetic or optical media. Other transformations of physical media are possible without departing from the scope of the present description, with the foregoing examples provided only to facilitate this discussion.

Referring again to FIG. 1, through the operation of a suitable computing system implementing enhanced menu process 200, transformations may be performed with respect to user interface 101. As an example, user interface 101 could be considered transformed from one state to another when subject to enhanced menu process 200 or variations thereof. In a first state, user interface 101 includes content presented in viewing pane 107 that is associated with a selected item. In response to a creation of an action group, an action menu is presented in a space occupied by the viewing pane 107, thereby changing user interface 101 to a second, different state.

It should be understood that computing architecture 300 is generally intended to represent an architecture on which software 305 may be deployed and executed in order to implement enhanced menu process 200 (or variations thereof) and optionally all or portions of a personal information application. However, computing architecture 300 may also be suitable for any computing system on which software 305 may be staged and from where software 305 may be distributed, transported, downloaded, or otherwise provided to yet another computing system for deployment and execution, or yet additional distribution.

Communication interface system 307 may include communication connections and devices that allow for communication with other computing systems over a network or collection of networks. Examples of connections and devices that together allow for inter-system communication may include network interface cards, antennas, power amplifiers, RF circuitry, transceivers, and other communication circuitry. The connections and devices may communicate over communication media to exchange communications with other computing systems or networks of systems, such as metal, glass, air, or any other suitable communication media. The aforementioned communication media, network, connections, and devices are well known and need not be discussed at length here.

User interface system 309 may include a mouse, a voice input device, a touch input device for receiving a touch gesture from a user, a motion input device for detecting non-touch gestures and other motions by a user, and other comparable input devices and associated processing elements capable of receiving user input from a user. Output devices such as a display, speakers, haptic devices, and other types of output devices may also be included in user interface system 309. In some cases, the input and output devices may be combined in a single device, such as a display capable of displaying images and receiving touch gestures. The aforementioned user input and output devices are well known in the art and need not be discussed at length here.

User interface system 309 may include associated user interface software executable by processing system 301 in support of the various user input and output devices discussed above. Separately or in conjunction with each other and other hardware and software elements, the user interface software and devices may support a graphical user interface, a natural user interface, or the like. In operation, user interface system 309 is capable of presenting a user interface to a personal information service, such as user interface 101 illustrated in FIG. 1. As such, a user may interact with a personal information service and associated applications through user interface 101 by way of user interface system 309.

FIG. 4 illustrates a service environment 400 in which various personal information applications may implement all or portions of enhanced menu process 200. Service environment 400 includes application platform 401, application platform 403, application platform 405, service platform 407, service platform 409, and communication network 410. Application platform 401 and application platform 403 communicate with service platform 407 to access personal information service 417 on behalf of personal information application 411 and personal information application 413 respectively. Application platform 405 communicates with service platform 409 to access personal information service 419 on behalf of personal information application 415. From time to time, service platform 407 and service platform 409 may communicate to enable interaction between personal information service 417 and personal information service 419, and by extension, interaction by application platforms 401 and 403 with application platform 405.

Examples of application platforms 401, 403, and 405, include, but are not limited to, desktop computers, work stations, laptop computers, notebook computers, tablet computers, mobile phones, personal digital assistances, media devices, gaming devices, routers, and any other physical or virtual computing machine, or combinations and variations thereof, capable of implementing at least one of a variety of personal information applications. Service platform 407 may be any computing system or collection of computing systems capable of implementing all or portions of a personal information service 417, while service platform 407 may be any computing system or collection of computing systems capable of implementing all or portions of a personal information service 419.

Application platforms 401, 403, and 405 may each be any computing apparatus, system, device, or collections thereof that employ a computing architecture suitable for implementing personal information applications 411, 413, and 415 respectively, the execution of which results in the rendering or presentation of user interfaces 421, 423, and 425 respectively. Computing architecture 300, referred to with respect to FIG. 3, is one such representative architecture. Personal information applications 411, 413, and 415 may each be any version or variety of personal information application. Examples include but are not limited to locally installed and executed applications, streamed applications, web-based applications that execute at least in part within the context of a browser application, mobile applications, mobile web-based applications that execute at least in part within the context of a mobile browser application, or any other application type, variation, or combination thereof.

User interfaces 421, 423, and 425 may each be any type of software interface that enables a user to interact with a personal information service. The execution of personal information applications 411, 413, and 425 by application platforms 401, 403, and 405 results in the presentation of user interfaces 421, 423, and 425 by way of their respective user interface systems, of which user interface system 309 is representative. Examples of user interfaces 421, 423, and 425 include graphical user interfaces, natural user interfaces, web-based user interfaces, gesture-based user interfaces, and object-oriented user interfaces, as well as any other type of user interface, combinations, or variations thereof. User interface 101 or variations thereof is representative of user interfaces 421, 423, and 425.

Personal information applications 411, 413, and 415 may each be embodied in program instructions that, when executed by application platforms 401, 403, and 405 respectively, direct each to operate as described herein for enhanced menu process 200 discussed with respect to FIG. 2. The program instructions may take the form of compiled object code, interpreted scripts, or any other suitable form of program instructions that may be executed directly or indirectly by an application platform, as well as any suitable variation or combination thereof. Examples of personal information applications include but are not limited to Microsoft® Outlook®, Mozilla Thunderbird/Lightening, Open Xchange, Microsoft® Outlook® Web App, Microsoft® Outlook® Web App for mobile devices, Outlook.com®, Gmail, and Microsoft® Outlook® for mobile devices, as well as any other suitable personal information application, variation, or combination thereof.

Service platform 407 and service platform 409 may each include any computing apparatus, system, device, or collections thereof that employ a computing architecture suitable for implementing personal information service 417 and personal information service 419 respectively. Computing architecture 300 referred to with respect to FIG. 3 is one such representative architecture. Examples include server computers, cloud computing platforms, data centers, and any physical or virtual computing machine, as well as any variation or combination thereof. Examples of personal information service 417 and personal information service 419 include, but are not limited to, Microsoft® Exchange®, Microsoft® O365®, Hotmail®, Outlook.com®, and Gmail, as well as any other information exchange service, combination, or variation thereof capable of operating as described herein.

In operation, any of applications platforms 401, 403, and 405 may communicate with service platform 407 or service platform 409 over communication network 410 to facilitate the exchange of information between personal information applications 411 and 413 and personal information service 417, and between personal information application 415 and personal information service 419. Service platform 407 and service platform 409 may also communicate over communication network 410 to facilitate the exchange of information. For example, information may be exchanged to facilitate the sending and receiving of email, the creation and monitoring of calendar events, the creation and monitoring of tasks, and to facilitate the searching of email, events, and tasks, as well as for other reasons. Such communication is generally well known in the art and need not be discussed at length here.

Communication between any of the elements contemplated in FIG. 4 may occur in accordance with various communication protocols, such as the Internet protocol (IP, IPv4, IPv6, etc.), the transfer control protocol (TCP), and the user datagram protocol (UDP), as well as any other suitable communication protocol, variation, or combination thereof. Communication network 410 may be representative of a network or collection of networks over which the elements contemplated in FIG. 4 may exchange information, such as an intranet, the Internet, a local area network, a wide area network, a wireless network, a wired network, or any combination or variation thereof. Communication network 410 may include connections, devices, and communication media, such as metal, glass, air, or any other suitable communication media over which information may be exchanged. The aforementioned communication media, network, connections, protocols, and devices are well known and need not be discussed at length here.

The manner and format in which information is exchanged may vary. In some implementations, a personal information application may exchange information with a personal information service in accordance with various protocols, such as IMAP (internet message access protocol), POP (post office protocol), SMTP (simple mail transfer protocol), OWA (Outlook Web App) webmail protocol, various other webmail protocols, various proprietary protocols, HTTP (hypertext transfer protocol), REST (representational state transfer), Web Socket, DOM (Document Object Model), HTML (hypertext markup language), CSS (cascading style sheets), HTML5, XML (extensible markup language), JavaScript, JSON (JavaScript Object Notation), and AJAX (Asynchronous JavaScript and XML), as well as any other suitable protocol, variation, or combination thereof.

Operating in accordance with enhanced menu process 200, a client device (application platforms 401, 403, 405) running a personal information application (personal information applications 411, 413, 415) renders a user interface (user interfaces 421, 423, 425) though which a user may interact with a personal information service in order to, for example, send and receive email, schedule events, communicate with contacts, or evaluate task, as well as for many other possible purposes. The user interface may include a viewing pane and an information panel in which to organize various personal information items, such as emails, contacts, events, tasks, and the like.

A user may navigate away from the selected item to select other items for viewing. The content displayed in the viewing pane would then change to that of the newly selected item. However, the user may also select another item or items concurrently with the initially selected item. In response to concurrently selecting the multiple items, or identifying an action group, an action menu is presented in at least a portion of a space in the user interface occupied by the viewing pane. In fact, the rendering of the action menu may occur directly in response to the selection of the second item.

In a brief example, a list of emails may be presented in an information panel. A user may select a check box associated with one email and then select a second check box associated with a second email. In response to selecting the second box, an action menu is rendered in a viewing panel in which content associated with any of the various emails may be been presented. The action menu includes various action features, the subsequent selection of which results in a corresponding action being carried out with respect to the concurrently selected emails.

While the preceding example made reference to two emails, it may be appreciated that the rendering of the action menu can occur in response to when a third, or fourth, or any incremental item is concurrently selected. Moreover, while an action menu may be rendered in response to the selection of a second, third, or other incremental item, the action menu may persist as additional items are added to the action group by selection.

Figure 5:
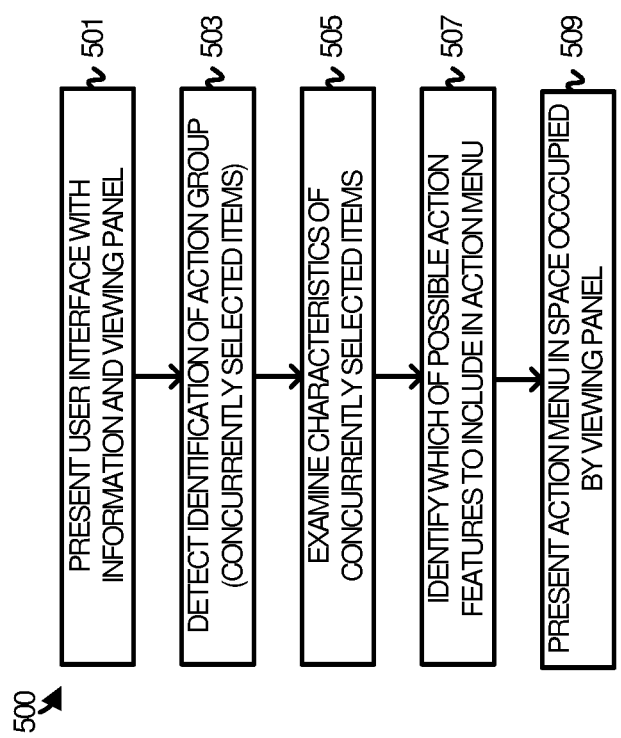
FIG. 5 illustrates an enhanced menu process carried out by a suitable computing platform or platforms in an implementation.
Figure 6:
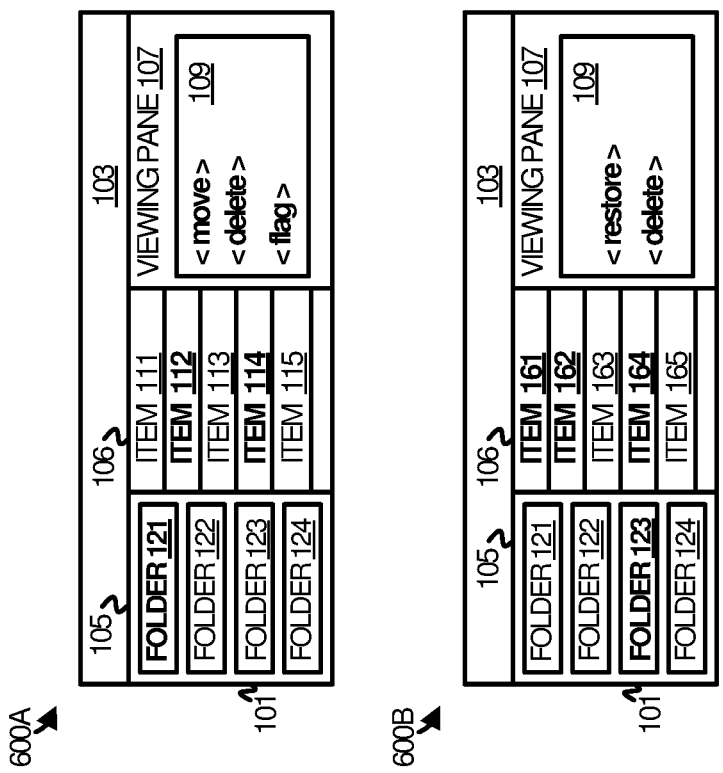
FIG. 6 illustrates a user interface to a personal information service and various operational scenarios in an implementation.
Figure 7:
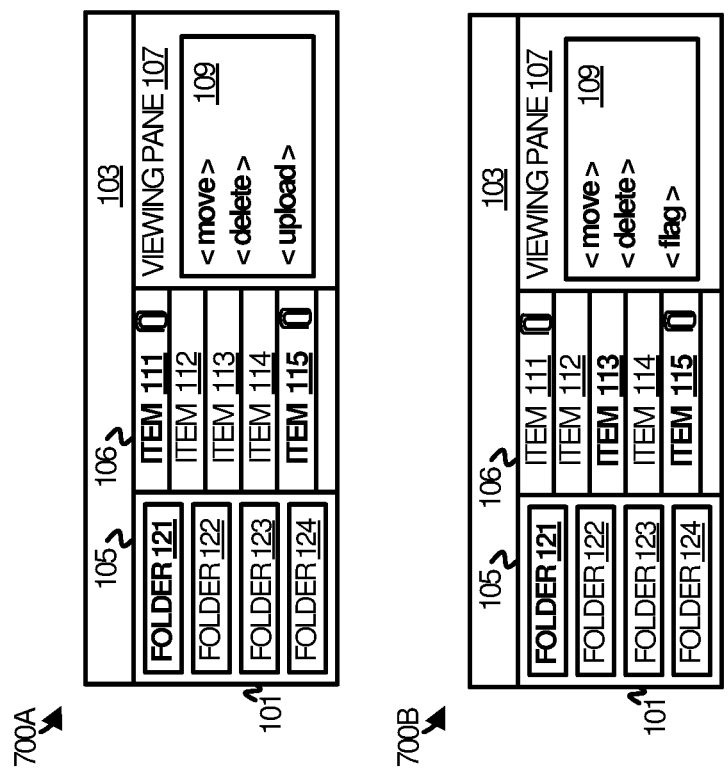
FIG. 7 illustrates a user interface to a personal information service and various operational scenarios in an implementation.
Figure 8:
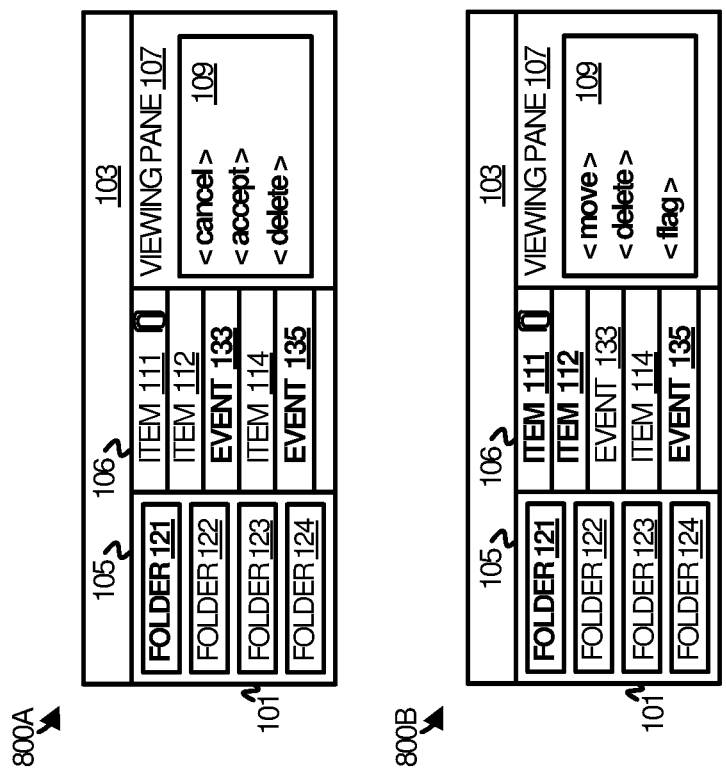
FIG. 8 illustrates a user interface to a personal information service and various operational scenarios in an implementation.

FIG. 5 illustrates enhanced menu process 500, representative of one variation of enhanced menu process 200 in which action features included in the action menu can be dynamically determined based on characteristics of the items that are selected. FIGS. 6-8 illustrate various operational scenarios relating to the various features and functionality that may be surfaced when implementing enhanced menu process 500.

In accordance with enhanced menu process 500, a client device (application platforms 401, 403, 405) running a personal information application (personal information applications 411, 413, 415) renders or otherwise presents a user interface (user interfaces 421, 423, 425) though which a user may interact with a personal information service in order to, for example, send and receive email, schedule events, communicate with contacts, or evaluate task, as well as for many other possible purposes (step 501). The user interface may include a viewing pane and an information panel in which to organize various personal information items, such as emails, contacts, events, tasks, and the like.

A user may navigate away from the selected item to select other items for viewing. The content displayed in the viewing pane would then change to that of the newly selected item. However, the user may also select another item or items concurrently with the initially selected item. The concurrent selection of the multiple items is detected (step 503) and characteristics of each of the multiple items in the action group are examined (step 505). Which action features are included in an action menu are identified based on the characteristics (step 507). The attachment status, the folder location, and the identity of contacts in each item are examples of characteristics that may be considered when selecting action features to include in an action menu.

The action features included in the action menu may change dynamically as additional items are added to an action group. For example, an initial set of items selected for a group may each include an attachment, in which case an attachment-related feature may be included in the action menu. The subsequent selection of an item that does not include an attachment may then cause the attachment-related feature to be removed from the menu.

Once the action features are identified, the action menu is presented in at least a portion of a space in the user interface occupied by the viewing pane. In fact, the rendering of the action menu may occur directly in response to the selection of the second item.

FIGS. 6-8 include various operational scenarios involving a user interface to a personal information service to illustrate various features and functionality provided by enhanced menu process 500. The various features and functionality illustrated with respect to the operational scenarios may be experienced when enhanced menu process 500 is carried out by a suitable computing system running a personal information application. User interface 101 is representative of user interfaces 421, 423, and 425 illustrated in FIG. 4. Examples of user interface 101 include graphical user interfaces, natural user interfaces, web-based user interfaces, gesture-based user interfaces, and object-oriented user interfaces, as well as any other type of user interface, combinations or variations thereof.

Referring now to FIG. 6, one operational scenario 600A is illustrated in which the folder associated with various items in an action group factors into which action features are selected for an action menu. In operational scenario 600A, folder 121 is selected and may be assumed to be an inbox. Accordingly, items 111-115 presented in information panel 106 are items located in the inbox. In addition, item 112 and item 114 are selected for inclusion in an action group.

In response to item 112 and item 114 being identified for inclusion in the action group, various characteristics are examined to determine which action features to include in an action menu. The action menu is then presented in a viewing pane. In this scenario, item 112 and item 114 are both located in the inbox. As such, action menu 109 presented in viewing pane 107 includes a move feature, a delete feature, and a flag feature. These features are provided merely for exemplary purposes. Other features in addition to or in place of these features are possible and are within the scope of the present disclosure. Selection of the move feature would trigger a move operation with respect to item 112 and item 114, while selection of the delete feature would delete the selected items and selection of the flag feature would flag the items for later attention.

The folder selected in operational scenario 600B differs relative to the folder selected in operational scenario 600A to illustrate for exemplary purposes how the folder associated with each item in a group may effect which action features are included in an action group. In this scenario, folder 123 (a trash folder) is selected and items 161-165 presented accordingly. Item 161, item 162, and item 164 are then selected for inclusion in an action group. Action menu 109 is responsively presented with two action features included therein: a restore feature and a delete feature. Other features in addition to or in place of these features are possible and are within the scope of the present disclosure. Selection of the restore feature would restore the selected items to the inbox, while selection of the delete feature would permanently delete the selected items.

Operational scenario 700A, illustrated in FIG. 7, is representative of a scenario in which the attachment status associated with various items in an action group factors into which action features are selected for an action menu. In operational scenario 700A, folder 121 is selected, again representing an inbox. Accordingly, items 111-115 presented in information panel 106 are items located in the inbox. In addition, item 111 and item 115 are selected for inclusion in an action group, both of which are illustrated as having an attachment.

In response to item 111 and item 115 being identified for inclusion in the action group, various characteristics are examined to determine which action features to include in an action menu. The action menu is then presented in a viewing pane. In this scenario, item 111 and item 115 both have an attachment. Action menu 109, presented in viewing pane 107, therefore includes a move feature, a delete feature, and an upload feature. Other features in addition to or in place of these features are possible and are within the scope of the present disclosure. Selection of the move feature would trigger a move operation with respect to item 111 and item 115, while selection of the delete feature would delete the selected items. Selection of the upload feature would allow the attachments in both items to be uploaded to a service or some other storage location.

The items selected in operational scenario 700B differ slightly relative to the items selected in operational scenario 700A to illustrate for exemplary purposes how the attachment status of each item in a group may effect which action features are included in an action group. In this scenario, folder 121 (inbox) is selected and items 111-115 presented accordingly. Item 113 and item 115 are selected for inclusion in an action group, only one of which has an attachment. Action menu 109 is responsively presented with three action features included therein: a move feature, a delete feature, and a flag feature. Other features in addition to or in place of these features are possible and are within the scope of the present disclosure. The action features included in action menu 109 in operational scenario 700B relative to those included in operational scenario 700A differ due to the attachment status of each item. Because only one of the items selected in operational scenario 700B includes an attachment, the upload feature is not included in the action menu.

In FIG. 8, operational scenario 800A and operational scenario 800B illustrate how the type of each item included in an action group may effect which action features are included in an action menu.

In operational scenario 800A, folder 121 is selected and item 111, item 112, event 133, item 114, and event 135 are displayed accordingly. Event 133 and event 135 are then selected for inclusion in an action group. Because each item in the action group is an event, such as an event invitation or the like, the action features included in the action menu 109 relate to event features. Accordingly, action menu 109 is presented in viewing pane 107, including a cancel feature, an accept feature, and a delete feature. The subsequent selection of any one of the cancel, accept, and delete features would cause all of the events to be canceled, accepted, or deleted respectively. Other features in addition to or in place of these features are possible and are within the scope of the present disclosure.

In operational scenario 800B, item 111, item 112, and event 135 are selected for inclusion in an action group. It is assumed for illustrative purposes that item 111 and item 112 are not events, but rather may be emails, tasks, or the like. The action features identified for inclusion in action menu 109 differ from those identified in operational scenario 800A because of the heterogeneous nature of the items.

The functional block diagrams, operational sequences, and other diagrams provided in the Figures are representative of exemplary architectures, environments, and methodologies for performing novel aspects of the disclosure. While, for purposes of simplicity of explanation, methods included herein may be in the form of a functional diagram, operational sequence, or flow diagram, and may be described as a series of acts, it is to be understood and appreciated that the methods are not limited by the order of acts, as some acts may, in accordance therewith, occur in a different order and/or concurrently with other acts from that shown and described herein. For example, those skilled in the art will understand and appreciate that a method could alternatively be represented as a series of interrelated states or events, such as in a state diagram. Moreover, not all acts illustrated in a methodology may be required for a novel implementation.

The included descriptions and figures depict specific implementations to teach those skilled in the art how to make and use the best option. For the purpose of teaching inventive principles, some conventional aspects have been simplified or omitted. Those skilled in the art will appreciate variations from these implementations that fall within the scope of the invention. Those skilled in the art will also appreciate that the features described above can be combined in various ways to form multiple implementations. As a result, the invention is not limited to the specific implementations described above, but only by the claims and their equivalents.

What is claimed is:

1. One or more computer readable storage media having a personal information application stored thereon for facilitating enhanced interaction with a personal information service that, when processed by a computing system, directs the computing system to at least:

enable presentation, in a user interface to the personal information service, of a viewing pane and an inbox;

subsequent to a selection of a first email of a plurality of emails in the inbox, enable presentation, in the viewing pane, of content associated with the first email;

in response to a selection of at least a second email of the plurality of emails, concurrent with the selection of the first email, disable presentation of the content associated with the first email; and while the first email and at least the second email remain selected, enable presentation of an action menu in at least a portion of the viewing pane previously occupied by the content associated with the first email.

2. The one or more computer readable storage media of claim 1 wherein the personal information application further directs the computing system to present the action menu subsequent to the selection of at least the second email.

3. The one or more computer readable storage media of claim 2 wherein the action menu comprises a plurality of action features applicable to at least the first email and the second email.

4. The one or more computer readable storage media of claim 2 wherein the personal information application further directs the computing system to apply to at least the first email and the second email an action corresponding to a selection of an action feature from the action menu.

5. The one or more computer readable storage media of claim 2 where the personal information application further directs the computing system to identify, based at least in part on at least one characteristic of the first email and the second email, which of a plurality of possible action features to include in the action menu.

6. The one or more computer readable storage media of claim 5 wherein the at least one characteristic comprises an attachment status and a folder location of the first email and the second email.

7. The one or more computer readable storage media of claim 1 wherein to disable presentation of the content associated with the first email, the personal information application further directs the computing system to disable presentation of the viewing pane.

8. A method for facilitating enhanced interaction with a personal information service, the method comprising:
enabling presentation of a user interface to the personal information service comprising a viewing pane and an inbox;
subsequent to a selection of a first email of a plurality of emails in the inbox, enabling presentation, in the viewing pane, of content associated with the first email;
while the first email remains selected and in response to a selection of at least a second email of the plurality of emails, disabling presentation of the content associated with the first email; and
while the first email and at least the second email remain selected, enabling presentation of an action menu in at least a portion of the viewing pane previously occupied by the content associated with the first email.

9. The method of claim 8 wherein the method further comprises, present the action menu subsequent to the selection of at least the second email.

10. The method of claim 9 wherein the action menu comprises a plurality of action features applicable to at least the first email and the second email.

11. The method of claim 9 further comprising applying to at least the first email and the second email an action corresponding to a selection of an action feature from the action menu.

12. The method of claim 9 further comprising identifying, based at least in part on at least one characteristic of the first email and the second email, which of a plurality of possible action features to include in the action menu.

13. The method of claim 12 wherein the at least one characteristic comprises an attachment status and a folder location of the first email and the second email.

14. The method of claim 9 wherein enabling presentation of the action menu in at least a portion of the viewing pane comprises enabling presentation of a portion of the action menu over the viewing pane and another portion of the action menu over the inbox.

15. A computing apparatus comprising:
one or more computer readable storage media; and
program instructions stored on the one or more computer readable storage media for facilitating enhanced interaction with a personal information service that, when executed by a processing system, direct the processing system to at least:
enable presentation of a user interface to the personal information service comprising a viewing pane and an inbox;
subsequent to a selection of a first email of a plurality of emails in the inbox, enable presentation, in the viewing pane, of content associated with the first email;
while the first email remains selected and in response to a selection of at least a second email of the plurality of emails, disable presentation of the content associated with the first email;
identify, based at least in part on at least one characteristic of the first email and the second email, which of a plurality of possible action features to include in an action menu; and
while the first email and at least the second email remain selected, enable presentation of the action menu in at least a portion of the viewing pane previously occupied by the content associated with the first email.

16. The computing apparatus of claim 15 wherein, present the action menu subsequent to the selection of at least the second email, wherein the action menu comprises a plurality of action features applicable to at least the first email and the second email.

17. The computing apparatus of claim 16 wherein the program instructions further direct the processing system to initiate application, to at least the first email and the second email, of an action corresponding to a selection of an action feature from the action menu.

18. The computing apparatus of claim 16 wherein the content associated with the first email comprises at least a body of the first email.

19. The computing apparatus of claim 16 wherein at least one of the plurality of action features comprises an attachment handling feature that, when an attachment status indicates a presence of an attachment for both the first email and the second email, handles any attachments in both the first email and the second email.

20. The computing apparatus of claim 16 wherein the action menu is presented in response to a right-click action.

21. The computing apparatus of claim 16 wherein the program instructions further direct the processing system to initiate the presentation of the action menu in a location of the viewing pane previously occupied by the content associated with the first email.

* * * * *